Figure 1:
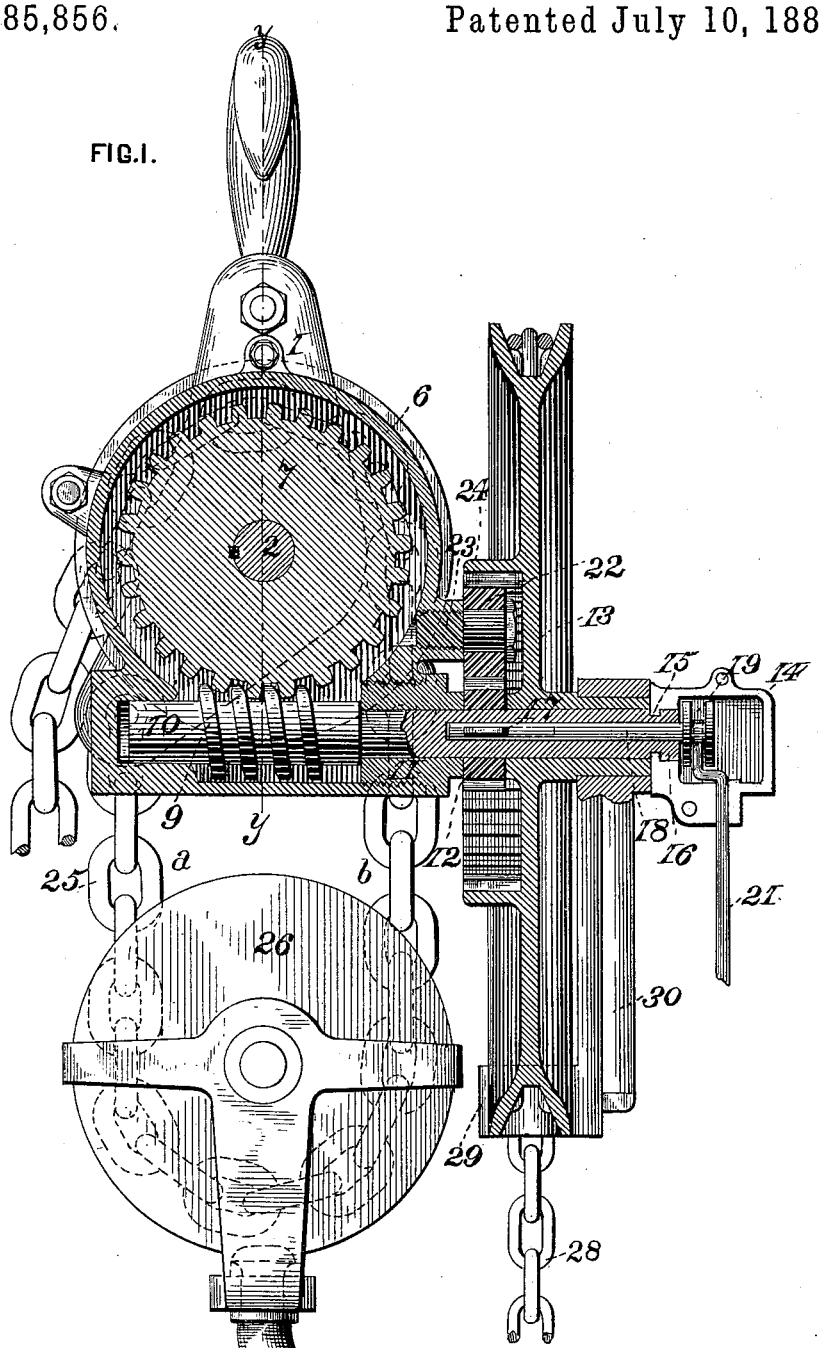

(No Model.) 2 Sheets—Sheet 1.

J. T. HAMBAY.
HOISTING TACKLE.

No. 385,856. Patented July 10, 1888.

WITNESSES:
F. E. Gaither
M. S. Murphy

INVENTOR,
James T. Hambay
by Darwin S. Wolcott
Att'y.

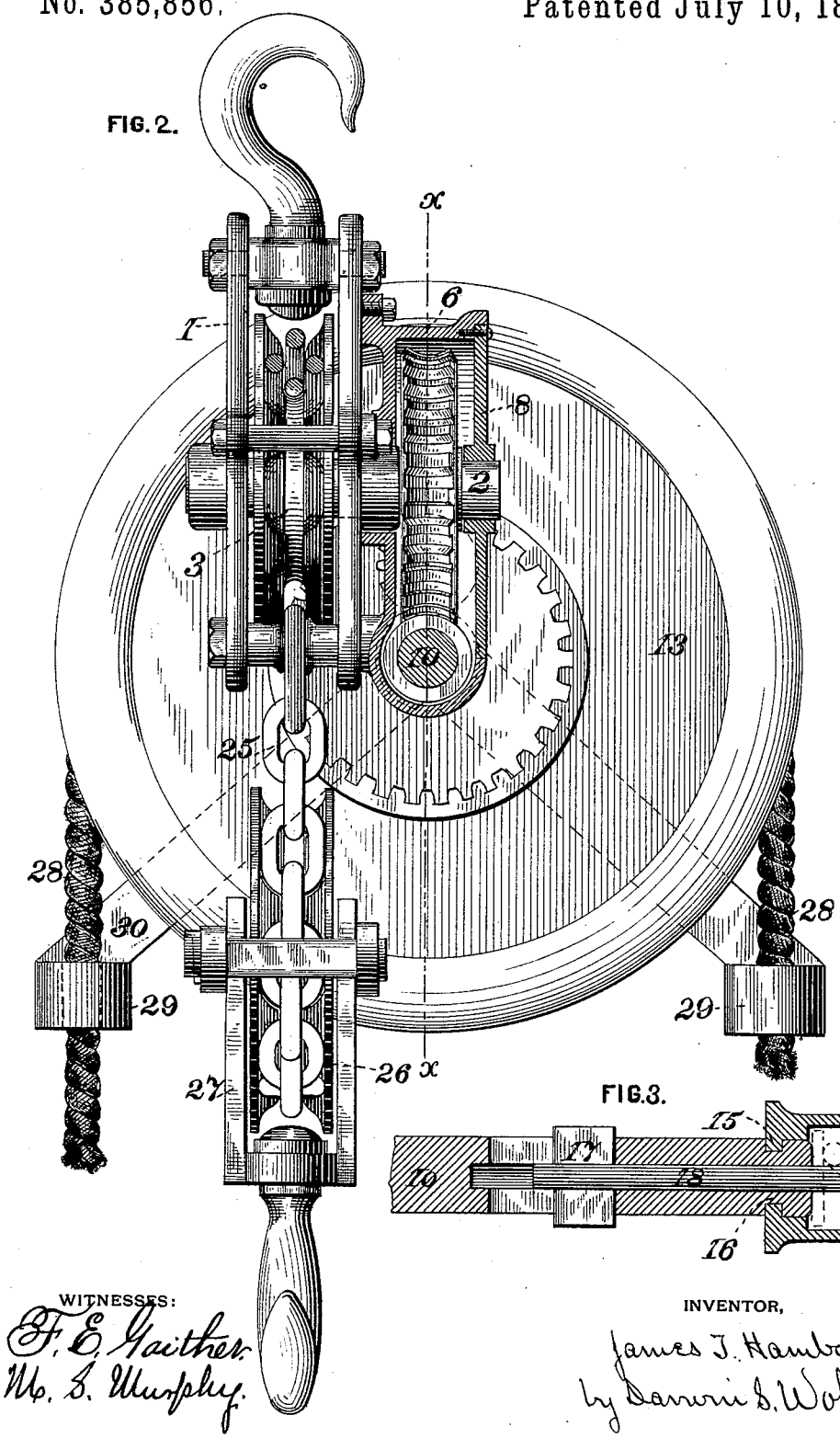

UNITED STATES PATENT OFFICE.

JAMES T. HAMBAY, OF PITTSBURG, PENNSYLVANIA.

HOISTING-TACKLE.

SPECIFICATION forming part of Letters Patent No. 385,856, dated July 10, 1888.

Application filed August 13, 1887. Serial No. 246,827. (No model.)

*To all whom it may concern:*

Be it known that I, JAMES T. HAMBAY, residing at Pittsburg, in the county of Allegheny and State of Pennsylvania, a citizen of the United States, have invented or discovered certain new and useful Improvements in Hoisting-Tackle, of which improvements the following is a specification.

The invention herein relates to certain improvements in hoisting-tackle, and has for its object such a construction and arrangement of the several parts that while the load is sustained and supported by two lines of chain or rope only one line of chain is actively employed in hoisting, thereby necessitating the expenditure of only half the force which would be required were both lines actively employed; and the invention has also for its object such a construction of idler or supporting pulley that the load thereon will always be supported by both strands or lines of chain, thereby relieving the portion of the chain passing under the idler of the greater part of the load; and it is a further object of the invention herein to provide a change of speed of the lifting pulley or wheel without any variation in the speed of the driving wheel or mechanism.

In general terms the invention consists in the construction and combination of parts, substantially as hereinafter more fully described and claimed.

In the accompanying drawings, forming a part of this specification, Figure 1 is a sectional elevation of my improved apparatus, the section being taken on the line *x x*, Fig. 2. Fig. 2 is a partial sectional view taken in the line *y y*, Fig. 1. Fig. 3 is a detail view, on an enlarged scale, of a portion of the driving-shaft.

Between the cheek or side plates, 1, forming bearings for the shaft 2, is arranged the sprocket-wheel 3, keyed to the shaft 2 and revolving therewith, said plates held in proper relation to each other by the tubular posts 4 and the bolts 5, passing through said posts.

To one of the side plates is bolted or otherwise secured the box 6, in which is arranged the gear-wheel 7, also keyed to the shaft 2. The open side of this box 6 is closed by a plate, 8, having a suitable opening therein for the reception of the end of the shaft 2 and serving as a bearing therefor. Along the lower side of the box 6 is formed a circular groove or recess for the reception of the worm or screw 9, formed on the power-shaft 10 and intermeshing with the teeth on the wheel 7. The inner end of the shaft 10 is mounted in a bearing formed in the box 6 at the end of the circular groove or recess, a bearing for the shaft at the opposite end of the threaded portion being formed by a hollow plug, 11, screwing into the box.

On the power-shaft are mounted the pinion 12 and the grooved wheel 13, held in position longitudinally of the shaft by the box 14, formed in two parts, as shown, adapted to be bolted together around the end of the shaft, each part being provided with an inwardly-projecting rib, 15, which engages a groove, 16, in the shaft near its outer end. The pinion and wheel are locked alternately to the shaft as against independent rotation by a key, 17, passing through a slot in the shaft and engaging grooves in the hubs of the pinion and wheel. This key is made of a width not greater than the length of the hub of the pinion and is shifted from engagement with the grooves of the pinion into those of the wheel 13, or vice versa, by a rod, 18, passing through a longitudinal opening in the shaft 10 and connected to the key at its inner end, its outer end being provided with a groove, 19, with which a crank-pin, 20, on the rod 21 engages, said rod being mounted in a suitable bearing formed in the meeting edges of the parts of the box 14. By the rotation of the rod 21 the key is shifted into or out of engagement with the pinion 12 and wheel 13, as above described. The pinion 12 intermeshes with an idler-pinion, 22, loosely mounted on a stud, 23, secured to the rear side of the box 6, (see Fig. 1,) said pinion 22 being also in engagement with gear-teeth on the interior surface of the annular flange 24, formed on the inner side of the power-wheel 13. The diameters of the pinions 12 and 22 and the toothed flange 24 are so proportioned that one revolution of the wheel 13 will cause two or more revolutions of the pinion 12 and of the shaft 10 when the pinion 12 is locked thereto by the key 17, as above described.

It will be readily understood from the above that by shifting the key 17 from engagement with the wheel 13 and into engagement with the pinion 12, and vice versa, the speed of the sprocket-wheel 3 may be increased or diminished without any change in the speed of the power-wheel 13.

One end of the chain 25 is secured to one of the bolts connecting the cheek or side plates 1, (see Fig. 1,) and passes down around the idler or supporting pulley 26, and thence up and around the sprocket-wheel 3, which is so constructed as regards its periphery that the links of the chain will fit snugly within recesses formed therein. The idler or supporting wheel 26 is usually constructed with a plain groove in its periphery for the reception of the chain. In such a construction, however, the whole load is borne by a single line of the chain at the lower side of the idler; but by substituting a sprocket-wheel for the ordinary idler the load will be to a large extent transferred to the vertical portions $a$ and $b$ of the chain, for the reason that the recesses in the idler 26 will engage the several links of the portion of the chain passing therearound. The idler is provided with the usual form of bridle, 27, to which a hook or other attaching device is connected.

In order to prevent the operating chain or rope 28 from being dislodged from the wheel 13, I provide guide-loops 29, through which the chain or rope passes, (see Fig. 2,) said loops being formed on the ends of arms 30, connected to a collar or ring loosely mounted on the shaft 10.

It will be readily understood that as one end of the chain is attached to the cheek-plates one-half the load will be supported thereby, and that therefore only half the power necessary to raise the whole load when entirely supported by the sprocket-wheel need be applied to the wheel 2.

I claim herein as my invention—

1. In a hoisting-tackle, the combination of the sprocket-wheel, a worm-and-gear mechanism for rotating said wheel, and a chain passing around the sprocket-wheel and having one end connected to the frame of the sprocket-wheel, said worm-and-gear mechanism serving not only to rotate the sprocket-wheel, but also as a stop for holding the load at any desired point, substantially as set forth.

2. In a portable hoisting-tackle, the combination of a sprocket-wheel, a worm-and-gear mechanism for rotating said wheel, a power-wheel mounted on the shaft of the worm and having a speed-connection to said shaft, and a power-connection thereto through interposed gearing, substantially as set forth.

3. In a portable hoisting-tackle, the combination of the sprocket-wheel, a worm-and-gear mechanism for rotating said wheel, a power-wheel and a pinion loosely mounted on the shaft of the worm, suitable gearing connecting the pinion and power-wheel, and a movable key for locking either the pinion or power-wheel to the shaft of the worm, substantially as set forth.

In testimony whereof I have hereunto set my hand.

JAMES T. HAMBAY.

Witnesses:
E. J. SMAIL,
DARWIN S. WOLCOTT.